United States Patent [19]

Duhamel

[11] Patent Number: 4,831,574
[45] Date of Patent: May 16, 1989

[54] DEVICE FOR COMPUTING A DIGITAL TRANSFORM OF A SIGNAL

[76] Inventor: Pierre Duhamel, 97 Avenue de Verdun, 92130 Issy Les Moulineaux, France

[21] Appl. No.: 92,986

[22] Filed: Sep. 4, 1987

[30] Foreign Application Priority Data

Sep. 4, 1986 [FR] France .................. 86 12431

[51] Int. Cl.$^4$ .............................................. G06F 7/38
[52] U.S. Cl. .................................................. 364/725
[58] Field of Search ................ 364/725, 726, 757, 754

[56] References Cited

U.S. PATENT DOCUMENTS

| 4,385,363 | 5/1983 | Widergren et al. | 364/725 |
|---|---|---|---|
| 4,449,194 | 5/1984 | Wilhelm | 364/725 |
| 4,675,836 | 6/1987 | Arnould et al. | 364/725 |
| 4,754,491 | 6/1988 | Mischler et al. | 382/41 |

OTHER PUBLICATIONS

IEEE Transactions on Computers, vol. 19, No. 9, Sep. 1972, pp. 1026-1027, New York, U.S.; V. J. Rechrt: "Signal flow graph and a fortran program for Haar-Fourier transform".

IEEE Transactions on Computers, vol. C-32, No. 12, Dec. 1983, pp. 1128-1136, IEEE, New York, U.S.; Chow et al: "A pipelined distributed arithmetic PFFT processor".

Primary Examiner—Gary V. Harkcom
Assistant Examiner—Tan V. Mai
Attorney, Agent, or Firm—Larson and Taylor

[57] ABSTRACT

Most of the useful discrete transforms of a signal X represented by N binary samples $x_0 \ldots, x_i \ldots, x_{N-1}$ (Where N is a power of two) are such that, by combining the samples for obtaining the sum and the difference of couples of samples, the transforms may be converted into two transforms of half-length one of which may again be decomposed into two transforms of half-length. A device for computing such a discrete transform, for instance a discrete cosine transform (DCT) comprises a set of elementary circuits operating in serial arithmetic connected to receive the samples and arranged to provide the sums and differences of couples of the input samples on respective outputs; An additional circuit has inputs connected to the outputs of the elementary circuits for receiving the differences between couples of the input samples and for directly computing one of the two of the samples of the transform in distributed arithmetic. Another computing circuit distinct and different from the additional circuit has inputs connected to the elementary circuits and computes the remaining samples of the transform from the sums.

7 Claims, 5 Drawing Sheets

DEVICE FOR COMPUTING A DIGITAL TRANSFORM OF A SIGNAL

BACKGROUND OF THE INVENTION

1. Technical Field

The invention relates to a device for computing the digital transform of a signal which may be implemented on silicon.

There is a need for real time computation of transforms of a signal in a number of technical fields. Fast computation devices exist which fulfill that need when the transforms are of small length. On the other hand, such devices are not appropriate for computing transforms of great length, since the amount of computation which is required when conventional approaches are used is such that they cannot be carried out in real time.

As an example, there is a need for implementing a length 128 Fourier transform on PCM signals whose samples are available as eight bit words for videotext. It would also be of advantage to compute discrete cosine transforms (DCTs) of length 8 or 16 for image processing.

2. Prior Art

Many fast DCT algorithms have been proposed. Examples may be found in CHEN et al "A fast computational Algorithm for the Discrete Cosine Transform" in IEEE Trans. on comm., Vol. COM-25 No. 9, September 1977, pages 1004–1011; in JALALI et al "A High-speed FDCT Processor for real-time Processing of NTSC color TV signal" in IEEE Trans. on elec. comp., vol. EMC. 24, No. 2, May 1982, pages 278–286; and in LEE "A new algorithm to compute the Discrete Cosine Transform", IEEE Trans. on ASSP., Vol. ASSP-32, No. 6, December 1984, pages 1243–1245.

None of the algorithms simultaneously provide minimum arithmetic complexity, full regularity of the graph, good noise performances and high speed.

SUMMARY OF THE INVENTION

It is an object of the invention to provide a device which improves upon the presently existing devices for computing digital transforms and particularly digital transforms which have specific properties frequently encountered. It is a more specific object to provide a device which is fast enough for real time processing of digital transforms of high length.

For that purpose, it has first been necessary to make a theoretical study which led to the finding that most transforms which are of interest, particularly the discrete Fourier transform (TFD) and the discrete cosine transform (TCD) are such that, by an appropriate combination of the samples which represent the signal to be processed, it is possible to obtain two transforms of half-length one of which can again be split into two transforms of half length and so on.

A device according to the invention may be used for computing the discrete transform of a signal X represented by N binary samples $x_0, \ldots, x_i \ldots, x_{N-1}$, where N is a multiple (and typically a power) of 2 each time the transform is such that, by combining the samples for obtaining the sum and the difference of couples of samples, the transform may be changed into two transforms of half-length one of which may again be decomposed into two transforms of half-length.

The device comprises: a set of elementary circuits operating in serial arithmetic (bit per bit) providing the sums and differences of couples of input samples; an additional circuit having inputs connected to the outputs of said elementary circuits for receiving said differences between the input samples and for directly determining one out of two samples of the complete transform in distributed arithmetic; and computing means distinct from said additional circuit for computing the remaining samples of the complete transform.

Depending upon the length of the transform, it may be of advantage to compute the remaining samples using a conventional approach or to repeat the conversion into two transforms of half length (assuming that the number N is a multiple of 4) one of which is directly computed by addressing a memory and the other is dealt with by other computer means which may be conventional.

In other words, the device may be considered as having a set of elementary circuits, which pre-calculate sums and differences in serial arithmetic, then a circuit for computing one out of two of the samples (and possibly one out of two of the remaining samples and so on) in distributed arithmetic by addressing a memory.

When the transform is of great length, it may be of advantage to encode the input samples into a form such that the memory (typically a ROM) used in distributed arithmetic consists of a plurality of mutually identical fields. With that arrangement, the size of the memory may be reduced to the size of one of the fields, at the cost of a longer calculation time.

The invention will be better understood from the following description of particular embodiments given as examples. The description refers to the accompanying drawings.

DETAILED DESCRIPTION

Polynomial product in distributed arithmetic

Figure 1:
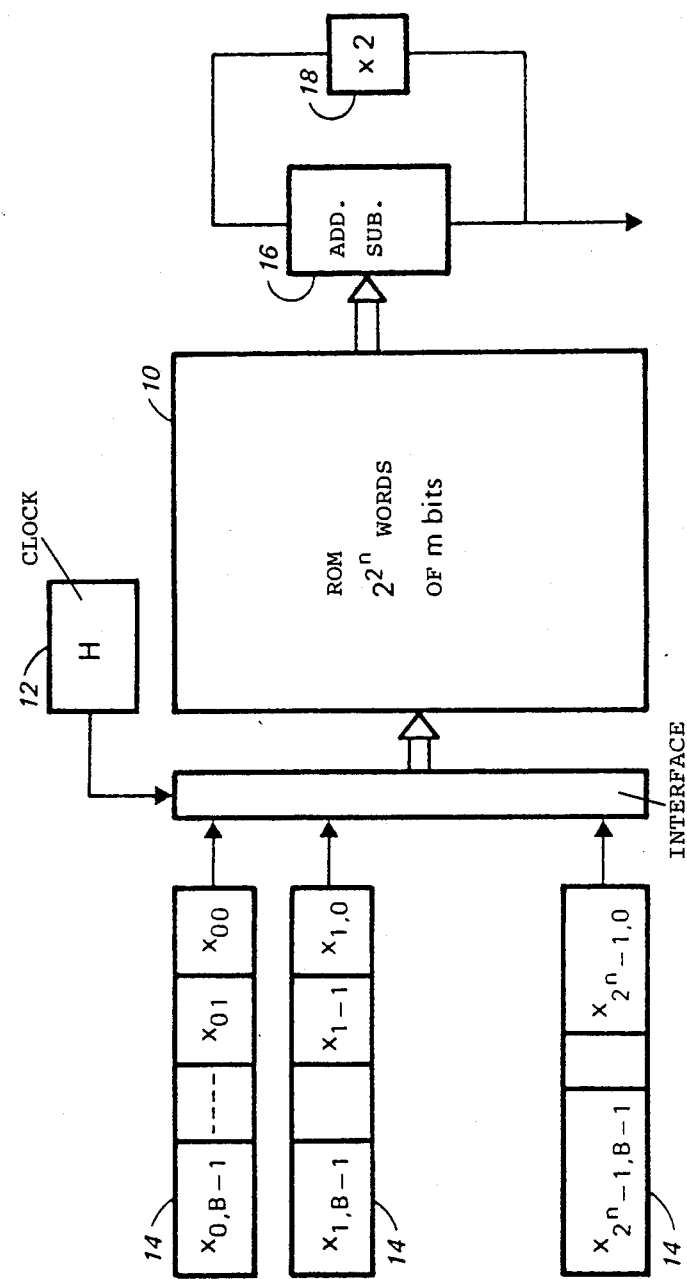
FIG. 1 is a sketch of a device for computation of polynomial products modulo ($z^{2n}+1$) in distributed arithmetic.

Before the invention is described, it may be useful to summarize indications on computation of polynomial products using distributed arithmetic. Reference may also be had to the documents identified above as well as to U.S. Pat. No. 3,777,130 which relates to the application of such computation to digital filtering.

Although the techniques which will be described are applicable to any inner product of the type:

$$y = \sum_{k=0}^{N-1} h_k \cdot x_k$$

the following description will be restricted to computation of polynomial products modulo ($z^{2n}+1$) using distributed arithmetic.

The product may be written as:

$$Y(z) = H(z) \times (z) \bmod(z^{2n}+1) \qquad (1)$$

where $$\begin{cases} Y(z) = \sum_{i=0}^{2^n-1} y_i \cdot z^i \\ H(z) = \sum_{i=0}^{2^n-1} h_i \cdot z^i \\ X(z) = \sum_{i=0}^{2^n-1} x_i \cdot z^i \end{cases}$$

The formula 1 may be written as a matrix (2):

$$\begin{pmatrix} y_0 \\ y_1 \\ \vdots \\ y_i \\ \vdots \\ y_{2^n-1} \end{pmatrix} = \begin{pmatrix} h_0 & -h_{2^n-2} & -h_{2^n-2} \cdots & -h_1 \\ h_1 & h_0 & -h_{2^n-1} \cdots & -h_2 \\ \vdots & & & \\ h_i & & & \\ \vdots & & & \\ h_{2^n-2} & & & -h_{2^n-1} \\ \vdots & & & \\ h_{2^n-1} & h_{2^n-2} & \cdots h_i \cdots h_1 & h_0 \end{pmatrix} \begin{pmatrix} x_0 \\ x_1 \\ \vdots \\ \\ \\ \\ x_{2^n-1} \end{pmatrix} \quad (2)$$

Each coefficient $Y_l$ may consequently be written:

$$Y_l = \sum_{i=0}^{2^n-1} a_{li} \cdot x_i \quad (3)$$

and may be computed in distributed arithmetic.

The numbers $x_i$ are each represented as a binary number consisting of a plurality of bits $x_{ij}$, with $j = 0, \ldots, B-1$. Two possibilities for representing $x_i$ will now be considered:

1. Representation of $x_i$ using two's complement numbers

Then:

$$x_i = -x_{i0} + \sum_{j=1}^{B-1} x_{ij} \cdot 2^{-j} \quad (4)$$

$Y_l$ may be represented as:

$$y_l = -\sum_{i=0}^{2^n-1} a_{li} x_{i0} + \sum_{j=1}^{B-1} \left( \sum_{i=0}^{2^n-1} a_{li} \cdot x_{ij} \right) 2^{-j} \quad (5)$$

In equation (5), the double sum consists of a succession of shifts and adds of elementary terms (consisting of the content of the brackets). Each term is obtained as the direct products of vector $a_l$ and a plurality of successive bits $x_{ij}$, with $i = 0, \ldots, 2^n - 1$.

For simplification, the family of functions each corresponding to the content of the brackets will be designated as $f_l$:

$$f_l(u_0, u_1, \ldots, u_{2^n-1}) = \sum_{i=0}^{2^n-1} a_{li} \cdot u_i \quad (6)$$

with $l = 0, \ldots, 2^n - 1$.

Each variable $u_i$ is a bit which may have different values only. As a consequence, each function $f_l$ may have $2^{2^n}$ different values. All values may be stored in a ROM having a content of $2^{2^n}$ words of m bits for a function whose range of variation requires m bits.

Each value of $y_l$ may then be computed using the circuit illustrated in FIG. 1. While the circuit as such is of simple structure, it requires a ROM having a capacity equal to $2^{2^n}$ words for each value of $y_l$ and consequently a very large ROM may be required.

Referring to FIG. 1, the ROM 10 is connected to receive addresses each consisting of the value of one of the variables $u_i$ at the rate of the pulses of clock 12. The variables will have values $x_{ij}$ successively corresponding to $i = 0, \ldots, 2^n - 1$, for all values of j from 0 to $B-1$, read out of registers 14. The output of the ROM 10 is applied to one of the inputs of an accumulator 16 constituting an adder-subtractor.

The other input of the accumulator receives the output of a multiplier-by-two 18 which constitutes a circuit for shifting the decimal point and the input of the multiplier receives the output of the adder subtractor 16. The latter adds or subtracts the content of the position in ROM 10 corresponding to the input binary configuration, delivered by the registers 14, according to equation (5).

After B pulses, the content of the output accumulator is equal to $y_l$.

For computing the polynomial product completely, the device should have $2^n$ sets as shown in FIG. 1, connected in parallel relation. Each set has a ROM 10 and an adder-subtractor 16. All these sets receive the addresses consisting of the bits of same weight of the input words.

Since the addresses are identical for all functions, the ROMs 10 of the $2^n$ different sets may be consolidated.

As an example, for $n=3$, $B=8$ and $m=14$ (i.e. if the function must be quantified on fourteen bits), eight ROMS of each 256 words of fourteen bits are required for implementing the circuit. Eight adder-subtractors each operating other sixteen bits should also be provided. The result is obtained after eight clock pulses. Such a circuit may be implemented on a chip.

2. Representation of $x_i$ in "modified inner code" (MIC)

The ROM 10 corresponding to the function $f_l$, as defined by equation 16, has some redundancy, since some elements may be derived from other elements by multiplying them with a number having a sign.

If it is preferred to reduce the size of the ROM 10 necessary for computing $f_l$ at the cost of slightly more complex arithmetic, the redundancy may be rendered complete by representing the numbers $x_i$ with a "modified inner code" or MIC which will now be described, rather than by using two's complement numbers.

If the representation of a number $x_i$ in MIC is designated as $x'_{ij}$, with $j = 1, \ldots, l$, the counterpart of the representation (4) of $x_i$ as a two's complement number is:

$$x_i = \sum_{j=0}^{B-1} 2^{-j-1}(x'_{ij} - \overline{x'_{ij}}) + 2^{-B}(x'_{iB} - \overline{x'_{iB}}) \quad (7)$$

with:

$$\begin{cases} x'_{i0} = \overline{x_{i0}} = 1 - x_{i0} \\ x'_{ij} = x_{ij} \text{ ou } 1 \le j \le B - 1 \\ x'_{iB} = 0 \end{cases} \quad (8)$$

If that MIC representation of $x_i$ is substituted for $x_i$ in equation (3), then:

$$\begin{aligned} y_l &= \sum_{i=0}^{2^n-1} a_{li} \left[ \sum_{j=0}^{B-1} 2^{-j-1}(x'_{ij} - \overline{x'_{ij}}) - 2^{-B} \right] \quad (9) \\ &= \sum_{j=0}^{B-1} \left[ \sum_{i=0}^{2^n-1} a_{li}(x'_{ij} - \overline{x'_{ij}}) \right] 2^{-j-i} - \sum_{i=0}^{2^n-1} a_{li} 2^{-B} \end{aligned}$$

Equation (9) may be modified into a form which reduces the number of parameters influencing $f_l$ by defining $\epsilon_{ij}$ as:

$$\epsilon_{ij} = x'_{ij} - \overline{x'_{ij}}$$

Then $\epsilon_{ij}$ will always be equal to $+1$ or $-1$ and the function $f_l$ to be stored in a ROM may then be written as:

$$f_l(\epsilon_{0j}, \epsilon_{ij}, \ldots, \epsilon_{2n-1\,j}) = \sum_{i=0}^{2^n-1} a_{li}\epsilon_{ij} \quad (10)$$

Since $\epsilon_{ij}$ is equal to $+1$ or $-1$, $\epsilon_{0j}$ be used as a factor and then:

$$f_l(\epsilon_{0j}, \epsilon_{ij}, \ldots, \epsilon_{2n-1\,j}) = \epsilon_{0j}\left[ a_{l0} + \sum_{i=1}^{2^n-1} a_{li}\epsilon_{ij}\epsilon_{0j} \right] \quad (11)$$

For simplification, $\eta_{ij}$ will be defined such as $$\epsilon_{ij}\cdot\epsilon_{0j} = \eta_{ij},$$

and then:

$$f'_l(\eta_{ij}, \ldots, \eta_{2n-1'j}) = a_{l0} + \sum_{i=1}^{2^n-1} a_{li}\cdot\eta_{ij} \quad (12)$$

It is seen that $f'_l$ becomes a function of $2^n-1$ parameters only and has $2^{2n}-1$ possible different values. The size of the required ROM is halved as compared with two's complement number coding. This is an advantage which may be important if the ROM is of large size. On the other hand, if a memory of limited size is sufficient, then the size reduction will not balance the longer computing duration and the increased complexity of the arithmetic operations, although that complexity increase is not so important. That low level of increased complexity will be appreciated if it is considered that the changes to be made to the schematics of FIG. 1 are minor in nature. It is sufficient to add:

an XOR gate between $\epsilon_{0j}$ and $\epsilon_{ij}$ for generating the variables $\eta_{ij}$ from $\epsilon_{ij}$, if it is assumed that the logical state 0 corresponds to $\epsilon_{ij} = -1$ and the logical state 1 corresponds to $\epsilon_{ij} = 1$;

a circuit for changing the sign of the word output by the ROM if $\epsilon_{0j}$ is equal to 0, the value to be sent in the accumulator being the result of an XOR operation over $\epsilon_{0j}$ and the bits output by the memory.

Since the supplemental term $$\sum_{i=0}^{2^n-1} a_{li}\cdot 2^{-B}$$

is fixed, it does not require a supplemental computing cycle time: it is sufficient to load it into the accumulator during initialization.

When a polynomial product is computed, the functions $f_l$ and $f_{l+1}$ as defined by equation (10) are not independent.

It can be seen that $$f_{l+1}(\epsilon_{0j}, \epsilon_{1j}, \ldots, \epsilon_{2n-1,j}) = f_l(\epsilon_{1j}, \epsilon_{2j}, \ldots, \epsilon_{2n-1,j}, -\epsilon_{0j})$$

That finding makes it possible to decrease the necessary size for computing a polynomial product when using distributed arithmetic and MIC code: It can be seen that $-\epsilon_{0j}$ can be represented in MIC code with one bit, consisting of the inversion of the logic symbol corresponding to $\epsilon_{0j}$. All polynomial products $y_l$, with $l=0, \ldots, 2^n-1$ may consequently be computed with a circuit as shown in FIG. 2.

Figure 2:
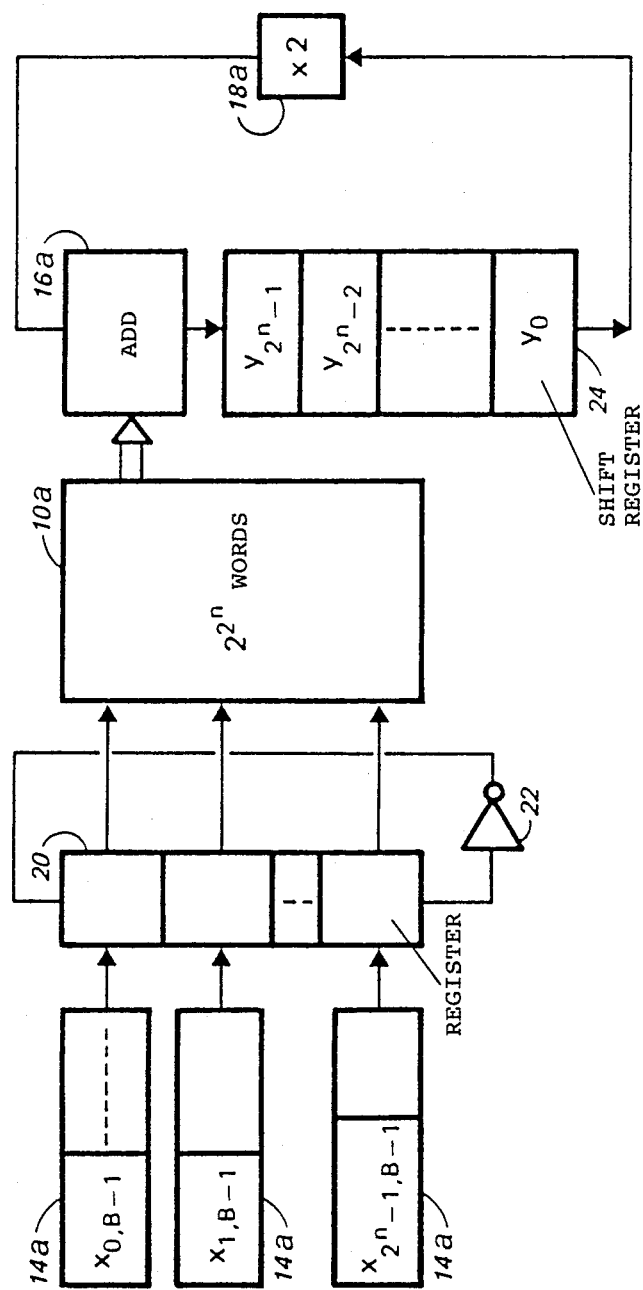
FIG. 2, similar to FIG. 1, illustrates a simplification obtained through the use of a so-called "modified inner coding"

Referring to FIG. 2, the elements already shown on FIG. 1 are designated by the same reference numeral with the index a. It will again be assumed that $e_i = -1$ is represented by the logic state 0 while $e_i = +1$ is represented by the logic state 1.

After every sequence of $2^n$ clock pulses, the registers 14a load a bit of each word $x_i$ into the register 20. Register 20 is for addressing the ROM 10a which has $2^{2n}$ words each of m bits. The memory 10a may be the same as one of the memories 10 of FIG. 1. Upon each clock pulse, there is a shift of the register 20, which has $2^n$ one-bit positions. The bit delivered by register 20 is reintroduced to the input of register, after it has been inverted in an inverter 22. Upon each clock pulse, the ROM 10a delivers on its output:

$f_0(\epsilon_0, \epsilon_1, \ldots, \epsilon_{2n-1})$, then $f_1(\epsilon_0, \ldots, \epsilon_{2n-1})$, then $f_2, \ldots$ etc.

The values $f_0, f_1, \ldots$ are cumulated, each time with the values corresponding to the contribution of the preceding bits of the input values, for computation of the respective output sample. For that purpose, the output of the ROM is again connected to an adder 16a constituting an accumulator. However the accumulator is not directly fed back by the multiplier circuit 18a. The output of the accumulator is connected to the input of the shift register 24 having 2n positions each of m+n bits (a lesser number being possible if a round-off is accepted).

After $B\cdot 2^n$ clock pulses, the shift register 24 contents the samples $y_0, \ldots, Y_{2n-1}$.

Then the complete polynome is computed after $B\cdot 2^n$ clock pulses while B clock pulses were sufficient in FIG. 1. On the other hand, a single ROM 10a is sufficient rather than $2^n$ ROMs.

Every intermediate solution is possible depending on the required speed. For instance, two ROMs of each $2^{2n}$ words may be used for carrying out computation during the time period corresponding to B. $2^{n-1}$ clock pulses.

The schematics of FIGS. 1 and 2 are based on the assumption that computation is made with the MSB loaded first into registers 14 and 14a. It would be possible to locate the LSB first, but then the multipliers 18 and 18a would be substituted with dividers by two, which corresponds to a shift in the opposite direction.

Specific Application to Computation of DCTs

Devices will now be described which make it possible to reduce the complexity of the calculations and the size of the memories required for computing any discrete transform of a signal represented by $N=2^n$ digital samples, on condition that the transform is such that it can be decomposed into polynomial products which are then computed by distributed arithmetic. Specific reference will be made to computation of DCTs but it should be understood that the same types of circuits are applicable for other transforms fulfilling the above condition. The gain on the complexity will essentially be provided by the fact that the necessary precalculations required before adressing a ROM are carried out in serial arithmetic.

As explained in Applicant's earlier application Ser. No. 010,702 to which reference may be made, the usual expression of the DCT may be substituted with an other expression which is better adapted for computation. The usual expression is:

$$X_k = \sum_{i=0}^{N-1} x_i \cdot \cos[(2\pi/4N)(2i+1)k] \quad (13)$$

with $k=0, \ldots, N-1$ and the modified expression is:

$$X_k = \sum_{i=0}^{N-1} x_i \cdot \cos[(2\pi/4N) < 5^i > 4Nk] \quad (14')$$

The simplification provided by the invention is based on the finding that a DCT, as other discrete transforms of a signal represented by $2^n$ samples, has the following properties:

the odd terms $X_{2k+1}$ are obtained as a product of two polynomes whose length is $2^n-1$;

the even terms $X_{2k}$ may be obtained as the result of a transform of half length.

The second property is well-known. The first property may be demonstrated. For that demonstration, the following function is considered:

$$Y_k = \sum_{i=0}^{N-1} x_i \cdot \cos[(2\pi/4N)(2i+1)(2k+1)], \quad (14)$$

with $k=0, \ldots, N-1$. The function $Y_k$ is the representation of an odd term, of order $2k+1$, of the discrete cosine transform $X_k$. That function $Y_k$ has the following property:

the first $N/2$ terms $Y_k$ (i.e. for $k=0, \ldots, (N/2)-1$ are equal to the first $N/2$ odd terms of the transform, the remaining $N/2$ terms are the opposite of the first $N/2$ terms and consequently it may be written that:

$$Y_k = X_{2k+1} \text{ with } k = 0, \ldots, \frac{N}{2} - 1 \quad (15)$$

$$Y_{N-k+1} = -X_{2k+1}$$

Function $Y_k$ as defined at (14) is symmetrical regarding i and k. As a consequence, the same substitution of variables as explained in application Ser. No. 010,702, introducing variables x' and then x'', are applicable for i and k. As a consequence, a function $Y_k$ may be represented as Y'k which is:

$$Y'_k = \sum_{i=0}^{N-1} x'_i \left[ \cos \frac{2\pi}{4N} (4i+1)(4k+1) \right] \quad (16)$$

with $Y'_k = Y_{2k} \; x'_i = x_{2i}$
$Y'_{N-k-1} = Y_{2k+1} \; x'_{N-i-1} = x_{2i+1}$, and $\left.\begin{matrix} i \\ k \end{matrix}\right\} = 0, \ldots, \frac{N}{2} - 1$ next, a new representation $Y''_k$ may be defined as:

$$Y''_k = \sum_{i=0}^{N-1} x''_i \cdot \cos \frac{2\pi}{4N} < 5^{i+k} > 4N \quad (17)$$

with $\begin{cases} Y''_k = \dfrac{Y' < 5^k > 4N - 1}{4} \\ x''_i = \dfrac{x' < 5^i > 4N - 1}{4} \end{cases}$ and $\left.\begin{matrix} i \\ k \end{matrix}\right\} = 0, \ldots, N - 1$ The polynome consisting of all odd terms $Y''_k$ may be written as:

$$Y(z) = \sum_{k=0}^{N-1} Y''_k \cdot z^k \quad (18)$$

or, starting from equation (17), $$Y(z) = X(z) \cdot W(z) \bmod(z^N - 1) \quad (19)$$

with $$\begin{cases} X(z) = \sum_{i=0}^{N-1} x''_i \cdot z^i \\ W(z) = \sum_{i=0}^{N-1} \cos \frac{2\pi}{4N} < 5^i > 4N \; z^i = \sum_{i=0}^{N-1} w_i z^i \end{cases} \quad (20)$$

Equation (15) indicates that there is a redundance between polynomes Y(z) and W(z). It may also be seen that:

$$Y''_{k+N/2} = -Y''_k$$

$$W_{i+N/2} = -W_i$$

All values $X_{2k+1}$ are mutually independent. As a consequence, the successive values taken by $Y''_l$ with $l=0, \ldots (N/2)-1$, will be equal to all values of $X_{2k+1}$, with possibly a sign change. The values will be identical for $k < N/2$. There will be a sign change when permutations which are reverse from those of equations (16) and (17) for $Y_k''$ with $k = 0, \ldots, (N/2)-1$ result into $k \geq N/2$.

If equations (18), (19) and (20) are written, modulo $(z^{N/2}+1)$ there is obtained:

$$Y'(z) = 2 \sum_{k=0}^{N/2-1} Y_k'' \cdot z^k \qquad (18\text{bis})$$

$$Y'(z) = X'(z) \cdot W'(z) \bmod (z^{N/2} + 1) \qquad (19\text{bis})$$

$$\begin{cases} X'(z) = \sum_{i=0}^{N/2-1} (x''_i - x''_{i+N/2}) z^i \\ W'(z) = 2 \sum_{i=0}^{N/2-1} \cos\frac{2\pi}{4N} < 5^i > 4N z^i \end{cases} \qquad (20\text{bis})$$

Consequently the odd terms of DCT are all obtained by a polynomial product modulo $z^{N/2}+1$.

As a consequence, a TCD of length $N = 2^n$ may be computed in two following steps rather than directly computed according to matrix (2) in distributed arithmetic. The two successive steps include:

a first step, constituting a precomputation step, which is implemented with "butterfly" modules conventionally used for computing transforms; such butterflies provide the elements necessary for computing the even terms and a polynomial product representing the odd terms;

a second step, consisting in computing the odd terms in distributed arithmetic, which requires an addressable memory of $2^{2n-1}$ words only. If the remaining length $2^{n-1}$ makes it of advantage, the even terms may be computed by repeating the same process and so on.

If the transform is of relatively short length, for instance if the length is 8, the increased complexity due to the use of MIC is not warranted. Then it will be preferable to compute the terms using two's complement numbers.

Computing circuit operating on two's complement numbers

Figure 3:
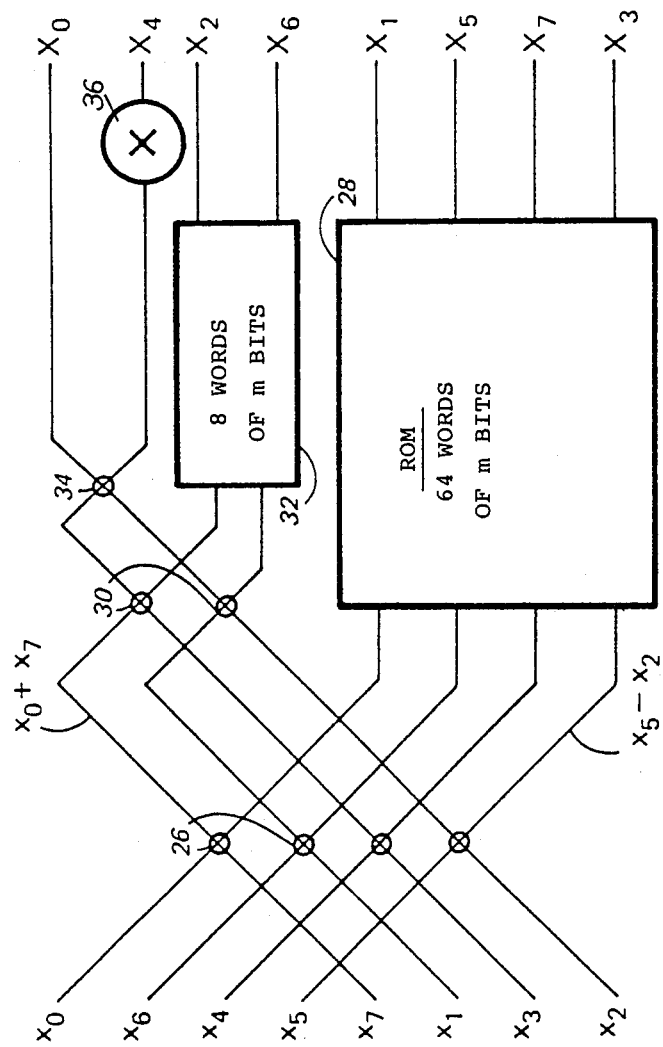
FIG. 3 is a sketch of a device for computation of a length-8 DCT according to the invention.

Referring to FIG. 3, there is shown a circuit for computing one of the terms y of a length-8 DCT, the input samples being coded as two's component numbers. The full device will include eight circuits as shown in FIG. 3.

The samples $x_0, \ldots, x_7$ are applied to a first bank of butterfly modules 26 which each deliver:
  the sum of the input terms on a first output,
  the difference of the input terms on a second output.

The operators 26 constitute a precomputation circuit operating in serial arithmetic, i.e. bit per bit, on words presented in parallel. The subtract output of the butterflies are applied as addresses to the address input of a ROM 28 which computes the matrix (2) in distributed arithmetic, on a length which is half that of the complete transform. If the length is 8, the ROM 28 should compute a polynomial product of length 4 modulo $z^4+1$. The ROM 28 should consequently have a capacity of 64 words of each m bits, m being the number of bits required by the range of variation of the output function.

The same sequence including a precomputation step, then a computation using distributed arithmetic may be repeated on the remaining even terms.

As shown in FIG. 3, there is a second bank 30 of butterflies, whose subtract outputs are applied to the address inputs of a ROM 32 which provides the results of polynomial products modulo $z^2+1$. Then the capacity of the ROM 32 may be as low as 8 words of m bits. Last, operator 34 and ROM 36 deliver the remaining terms.

Figure 4:
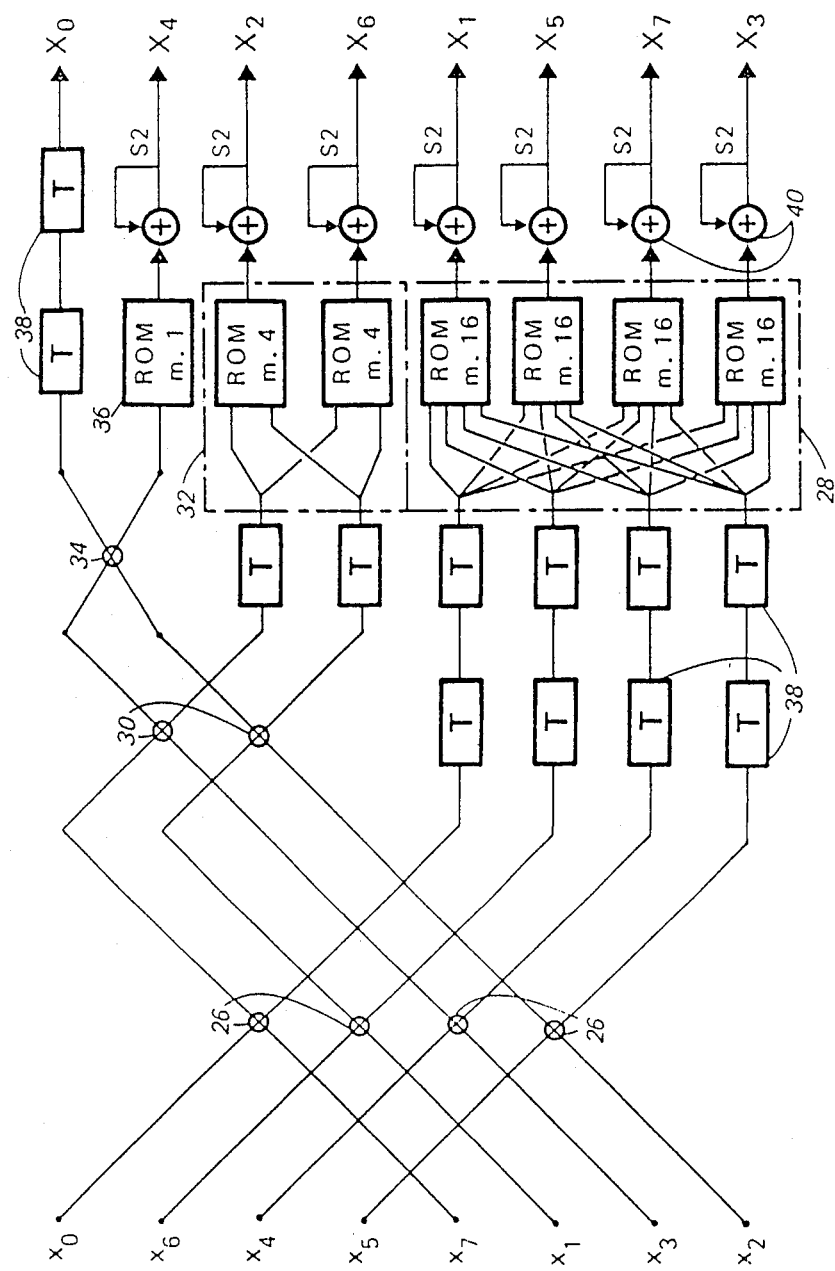
FIG. 4 is a block diagram corresponding to the sketch of FIG. 3.

The circuit may actually be implemented as illustrated in FIG. 4, where 28 and 32 again designate ROMs.

Each ROM is fractionated and all fractions have the same capacity, i.e. the same number of words each of m bits. For instance, the ROM 28 may consist of four fields of 16 words each, while the ROM 32 consists of two fields of four words and the ROM 36 for computing X4 has a content of one word only. Identical delay elements 38, which may consist of shift registers each having one bit only, provided with an input clock (not shown) are located in series relation with the inputs of the memories each for providing a delay equal to one clock period T. Due to that arrangement, the system may be pipelined.

Last, each memory field dedicated to a respective term X feeds an accumulator 40 consisting of an adder with a feed back. The complete set of elementary adders constitute a parallel operator.

Computing circuit using MIC

Rather than using a circuit which processes two's complement numbers, the samples may be initially coded in MIC with a circuit whose construction is directly apparent from the nature of the encoding as defined by formulae (7) and (8). It is then possible:
  to halve the size of the memories,
  to use memory fields of the same size which have the same arrangement in a same memory (for instance in ROM 28) or to use one field only in each memory, assuming that the field is used repetitively, at the cost of a degradation of the computation speed.

Figure 5:
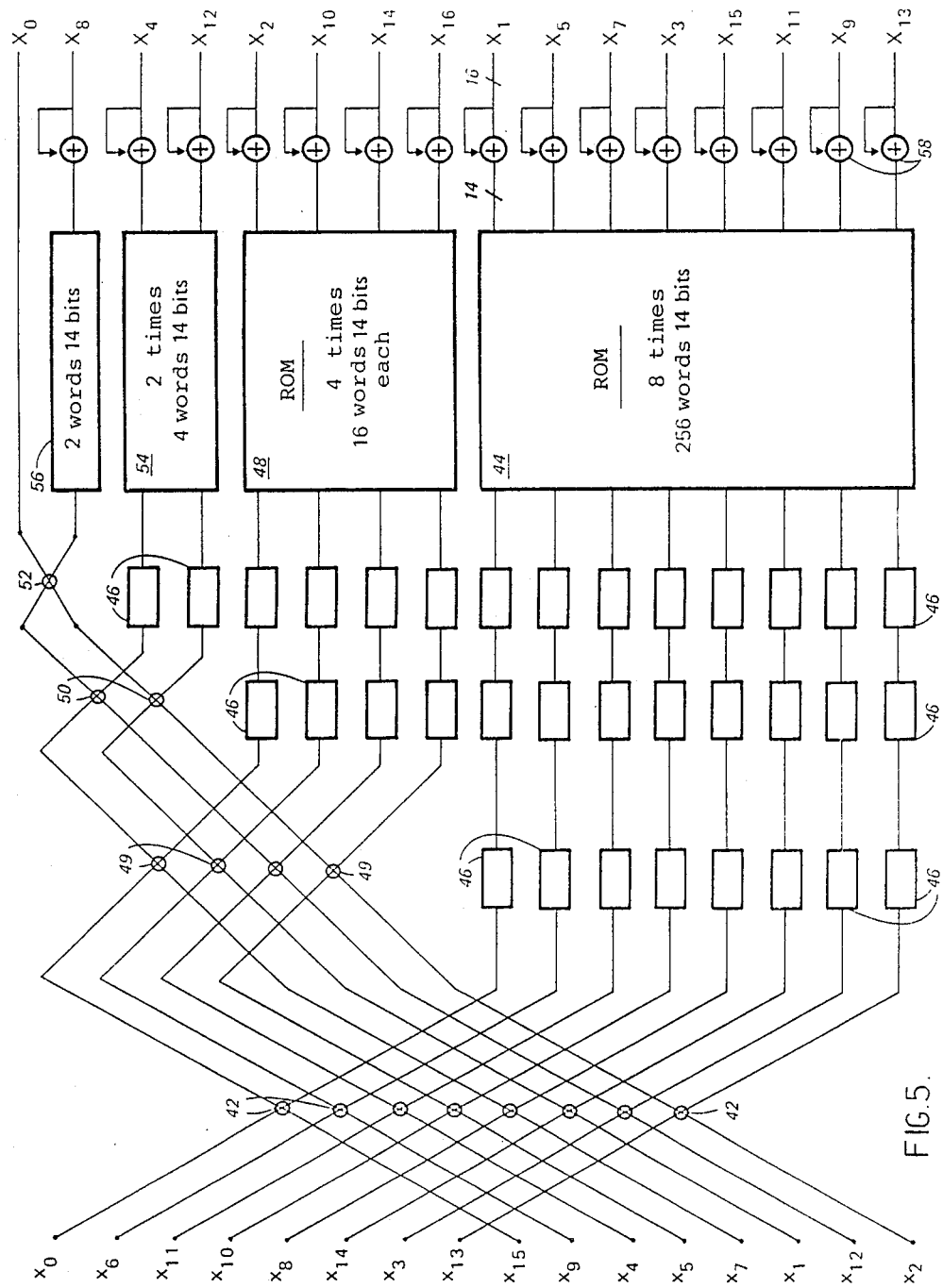
FIG. 5, similar to FIG. 4, is a block diagram of a device for computation of a length-16 DCT.

Again, assuming that MIC coding is used, the device for computation of a DCT of length 16 may be as shown in FIG. 5 where there is a first layer or bank of eight butterfly modules 42 which deliver:

terms which are computed in distributed arithmetic using a ROM 44 having 256 positions and 112 output pins, delivering the eight odd terms each coded on 14 bits.

Three time delay elements 46 are located in series relation on each input of ROM 44 for synchronization of the outputs by providing a delay equal to three clock periods T (that is of the number of periods T required for operation of the slowest channel, comprising four cascaded butterflies).

terms which are again subjected to precalculation for changing them into a polynomial product.

For that purpose a second bank of butterflies 49 combines the outputs of butterflies 42 for generating intermediate terms which are:

(i) directly used for generating terms which will now be considered as "odd":

$X_{2.1}, X_{2.3}, X_{2.5}, X_{2.7}$ (ii) will again be fractionated for finally providing:

$X_0, X_{2.2}, X_{2.2.2},$ and $X_{2.2.3}$

The data necessary for computation of the terms which are considered as "odd" during the second step are applied through two time delay generating elements 46 to a ROM 48 storing 4 times 16 words of 14 bits, having 16×14 output pins.

The same process is again carried out twice after additional decomposition with butterflies 50, then 52, for precomputation; addressable ROMs 54 and 56 are used. All output pins of the ROMs 44, 48, 54 and 56 are connected to inputs of adders-accumulators 58 which deliver the terms $X_0$–$X_{13}$ of the transform, for instance coded on 16 bits.

I claim:

1. Device for computing a discrete cosine transform of a signal X represented by N binary samples $x_0, \ldots, x_i, \ldots, x_{N-1}$, where N is a multiple of 2, said transform being such that, by combining said samples for obtaining the sum and the difference of couples of samples, the transforms are convertible into two transforms of half-length one of which is again convertible into two transforms of half-length, if N/2 is a multiple of 2, said device comprising:

a set of elementary circuits operating bit per bit in serial arithmetic connected to receive said binary samples and arranged to provide the sums and differences of couples of said input samples on respective outputs;

additional circuit means having inputs connected to the outputs of said elementary circuits for receiving said differences between couples of the input samples and for directly computing every other of the samples of the transform in distributed arithmetic; and computing means distinct and different from said additional circuit means having inputs connected to the other outputs of said elementary circuits for receiving said sums and computing the remaining samples of the transform from said sums.

2. Device according to claim 1, for computing said discrete transform of the signal X represented by N binary samples, where N/2 is even, wherein said computing means includes:

a set of further elementary circuits operating bit per bit in serial arithmetic arranged for precalculating sums and differences, further additional circuit means connected to receive said differences, for directly computing every other of the remaining samples of the transform in distributed arithmetic, and further computing means for computing the other ones of the remaining samples.

3. Device according to claim 2, wherein said further additional circuit means include butterfly modules connected to provide data necessary for computation of half of the remaining even terms and data necessary for computation of a polynomial product representing the balance of the even terms.

4. Device according to claim 1, wherein said additional circuit means comprises N/2 units, with $N=2^n$, each unit having a ROM for storing $2^2$ values, addressing means for addressing the ROMs successively with each of successive bits of the input samples and accumulator means having input means connected to output means of said ROM for receiving a value in said ROM being addressed, and multiplier means feeding back the output of said accumulator means to the input thereof.

5. Device according to claim 1, wherein said transform has odd terms and even terms and the odd terms are computed directly as a polynomial product of length $2^n-1$, the number N of the input samples being equal to $2^n$.

6. Device according to claim 1, wherein said transform has odd terms and even terms and the odd terms are obtained as a polynomial product modulo $(z^{N/2}+1)$.

7. Device according to claim 6, wherein the elementary circuits are for precomputation and comprise butterfly modules delivering data necessary for computing the even terms on an output and data necessary for computing a polynomial product representing the odd terms of the transform on an other output.

* * * * *